(12) United States Patent
Jacobs et al.

(10) Patent No.: US 8,168,880 B2
(45) Date of Patent: May 1, 2012

(54) SHINGLE WITH PHOTOVOLTAIC ELEMENT(S) AND ARRAY OF SAME LAID UP ON A ROOF

(75) Inventors: Gregory F. Jacobs, Oreland, PA (US); Husnu M. Kalkanoglu, Swarthmore, PA (US)

(73) Assignee: CertainTeed Corporation, Valley Forge, PA (US)

( * ) Notice: Subject to any disclaimer, the term of this patent is extended or adjusted under 35 U.S.C. 154(b) by 1692 days.

(21) Appl. No.: 11/412,160

(22) Filed: Apr. 26, 2006

(65) Prior Publication Data
US 2007/0251571 A1 Nov. 1, 2007

(51) Int. Cl.
*H01L 31/042* (2006.01)

(52) U.S. Cl. ........ 136/244; 136/251; 136/259; 52/173.3

(58) Field of Classification Search .......... 136/243–293; 52/173.3
See application file for complete search history.

(56) References Cited

U.S. PATENT DOCUMENTS

| | | |
|---|---|---|
| 3,906,221 A | 9/1975 | Mercier |
| 4,040,867 A | 8/1977 | Forestieri et al. |
| 4,390,595 A | 6/1983 | Yamagishi |
| 4,574,160 A | 3/1986 | Cull et al. |
| 4,663,495 A | 5/1987 | Berman et al. |
| 4,692,557 A | 9/1987 | Samuelson et al. |
| 4,860,509 A | 8/1989 | Laaly et al. |
| 4,924,301 A | 5/1990 | Surbrook |
| 5,164,020 A | 11/1992 | Wagner et al. |
| 5,232,518 A | 8/1993 | Nath et al. |
| 5,271,201 A | 12/1993 | Noone et al. |
| 5,287,669 A | 2/1994 | Hannah et al. |
| 5,375,491 A | 12/1994 | Hannah et al. |
| 5,400,558 A | 3/1995 | Hannah et al. |
| 5,419,941 A | 5/1995 | Noone et al. |
| 5,421,134 A | 6/1995 | Hannah et al. |
| 5,426,902 A | 6/1995 | Stahl et al. |

(Continued)

FOREIGN PATENT DOCUMENTS
DE 4421078 2/1996
(Continued)

OTHER PUBLICATIONS

Abstract of JP 02094575 (1990).
(Continued)

*Primary Examiner* — Basia Ridley
*Assistant Examiner* — Thanh-Truc Trinh
(74) *Attorney, Agent, or Firm* — Paul & Paul

(57) ABSTRACT

A shingle having butt and tab portions is provided, wherein the tab portions are exposed when applied to a roof, and wherein active photovoltaic element(s) appear on portions only of the tab portions of the shingles, wherein adjacent zones of the tab portions of the shingles to which the photovoltaic element(s) are applied are free of active photovoltaic elements. The shingles are applied to a roof or a major portion of a roof, laid up in courses so that exposed tab portions of next-overlying courses cover unexposed butt portions of next-underlying courses, leaving photovoltaic elements exposed. In an array of shingles on a roof, the photovoltaic elements are distributed substantially uniformally. The surface ornamentation of the exposed surfaces of the photovoltaic elements may be either complementary to the exposed surfaces of the shingles not having photovoltaic elements thereon, or may blend with such zones not having photovoltaic elements thereon.

16 Claims, 7 Drawing Sheets

U.S. PATENT DOCUMENTS

| | | | |
|---|---|---|---|
| 5,437,735 A * | 8/1995 | Younan et al. | 136/251 |
| 5,474,620 A | 12/1995 | Nath et al. | |
| D366,124 S | 1/1996 | Hannah et al. | |
| D366,335 S | 1/1996 | Noone et al. | |
| D366,336 S | 1/1996 | Noone et al. | |
| 5,501,056 A | 3/1996 | Hannah et al. | |
| 5,575,861 A | 11/1996 | Younan et al. | |
| 5,575,876 A | 11/1996 | Noone et al. | |
| 5,590,495 A | 1/1997 | Bressler et al. | |
| 5,650,019 A | 7/1997 | Yamada et al. | |
| 5,660,014 A | 8/1997 | Stahl et al. | |
| 5,700,332 A | 12/1997 | Brown et al. | |
| 5,725,006 A | 3/1998 | Kawama et al. | |
| 5,807,440 A | 9/1998 | Kubota et al. | |
| 5,830,779 A | 11/1998 | Bressler et al. | |
| 5,853,858 A * | 12/1998 | Bondoc | 428/195.1 |
| 5,877,874 A | 3/1999 | Rosenberg | |
| 5,951,809 A | 9/1999 | Jenkins et al. | |
| 6,049,035 A | 4/2000 | Tsuri et al. | |
| 6,184,057 B1 | 2/2001 | Van Andel et al. | |
| 6,245,987 B1 | 6/2001 | Shiomi et al. | |
| 6,268,558 B1 | 7/2001 | Kubota | |
| 6,274,860 B1 | 8/2001 | Rosenberg | |
| 6,311,436 B1 | 11/2001 | Mimura et al. | |
| 6,331,671 B1 | 12/2001 | Makita et al. | |
| 6,331,673 B1 | 12/2001 | Kataoya et al. | |
| 6,506,970 B2 | 1/2003 | Yamawaki | |
| 6,613,598 B1 | 9/2003 | Middelman et al. | |
| 6,762,508 B1 | 7/2004 | Kiso et al. | |
| 6,914,182 B2 | 7/2005 | Takeda et al. | |
| 6,928,775 B2 | 8/2005 | Banister | |
| 6,983,571 B2 | 1/2006 | Felton | |
| 7,227,078 B2 | 6/2007 | Jongerden et al. | |
| 7,387,537 B1 | 6/2008 | Daily et al. | |
| 7,445,508 B2 | 11/2008 | Daily et al. | |
| 7,572,396 B2 | 8/2009 | Gaudiana et al. | |
| 7,681,363 B2 | 3/2010 | Banister | |
| 2001/0050102 A1 | 12/2001 | Matsumi et al. | |
| 2003/0121228 A1 | 7/2003 | Stoehr et al. | |
| 2003/0154973 A1 | 8/2003 | Nyhart, Jr. et al. | |
| 2004/0247876 A1 | 12/2004 | LaFave et al. | |
| 2004/0253419 A1 | 12/2004 | Bleikolm et al. | |
| 2005/0100690 A1 | 5/2005 | Mayer et al. | |
| 2005/0102947 A1 | 5/2005 | McCaskill et al. | |
| 2005/0144870 A1 | 7/2005 | Dinwoodie | |
| 2005/0178428 A1 | 8/2005 | Laaly et al. | |
| 2005/0178429 A1 | 8/2005 | McCaskill et al. | |
| 2005/0178430 A1 * | 8/2005 | McCaskill et al. | 136/251 |
| 2005/0263179 A1 | 12/2005 | Gaudiana et al. | |
| 2005/0268962 A1 | 12/2005 | Gaudiana et al. | |
| 2006/0000178 A1 | 1/2006 | Almy | |
| 2006/0029815 A1 | 2/2006 | Woodruff et al. | |
| 2006/0032527 A1 | 2/2006 | Stevens et al. | |
| 2006/0042683 A1 | 3/2006 | Gangemi | |
| 2006/0048812 A1 | 3/2006 | Tomita | |
| 2006/0243318 A1 | 11/2006 | Feldmeier et al. | |
| 2007/0251571 A1 | 11/2007 | Jacobs et al. | |
| 2008/0178928 A1 | 7/2008 | Warfield et al. | |
| 2008/0271773 A1 | 11/2008 | Jacobs et al. | |
| 2008/0271774 A1 | 11/2008 | Kalkanoglu et al. | |
| 2009/0000221 A1 | 1/2009 | Jacobs et al. | |
| 2009/0000657 A1 | 1/2009 | Jacobs | |
| 2009/0014051 A1 | 1/2009 | Gumm | |
| 2009/0046684 A1 | 2/2009 | Yamamoto | |
| 2009/0133340 A1 | 5/2009 | Shiao et al. | |
| 2009/0133738 A1 | 5/2009 | Shiao et al. | |
| 2009/0133739 A1 | 5/2009 | Shiao et al. | |
| 2009/0133740 A1 | 5/2009 | Shiao et al. | |
| 2009/0159118 A1 | 6/2009 | Kalkanoglu et al. | |
| 2009/0178350 A1 | 7/2009 | Kalkanoglu et al. | |
| 2009/0194143 A1 | 8/2009 | Jacobs et al. | |
| 2009/0205270 A1 | 8/2009 | Shaw et al. | |
| 2009/0242015 A1 | 10/2009 | Wattman et al. | |

FOREIGN PATENT DOCUMENTS

| | | |
|---|---|---|
| DE | 19739948 | 3/1999 |
| EP | 0948004 | 10/1999 |
| EP | 0986109 | 3/2000 |
| EP | 1201842 | 5/2002 |
| FR | 2890181 | 1/2008 |
| FR | 2896596 | 1/2008 |
| JP | 07-211932 | 11/1995 |
| JP | 2001332752 | 11/2001 |
| JP | 06-045628 A | 2/2006 |
| JP | 08-139347 A | 6/2008 |
| WO | 93/08605 | 4/1993 |
| WO | 2007019183 | 2/2007 |
| WO | 2007035677 | 3/2007 |
| WO | 2007035677 A2 | 3/2007 |
| WO | 2007085721 | 8/2007 |

OTHER PUBLICATIONS

Abstract of JP 08312089 (1996).

Abstract of JP 2000/188411 (2000).

Abstract of JP 10093125 (1998).

Abstract of JP 63299171 (1988).

Abstract of JP 63213978 (1988).

D. L. King et al., Field Experience with a New Performance Characterization Procedure for Photovoltaic Arrays, Sandia National Laboratories, 2nd World Conference and Exhibition on Photovoltaic Solar Energy Conversion, Jul. 6-10, 1998, Vienna, Austria.

D. Aiken et al., Temperature Dependent Spectral Response Measurements for III-IV Multi-Junction Solar Cells, "Whitepaper," Emcore Photovoltaics, Nov. 19, 2003.

N.J.C.M. Van Der Borg et al., Building Integration of Photovoltaic Power Systems Using Amorphous Silicon Modules: Irradiation Loss Due to Non-Conventional Orientations, ECN-C-01-068, Dec. 2001.

J.J. Klaassen et al., AIGaN Photodiodes Respond to Ultraviolet C, DRC9925, NASA Tech Briefs, Feb. 2000.

S. Silvestre et al., A Fast Low-Cost Solar Cell Spectral Response Measurement System with Accuracy Indicator, IEEE Transactions on Instrumentation and Measurement, 48(5), pp. 944-948, Oct. 1999.

W.G.J.H.M Van Sark et al., Modeling Improvement of Spectral Response of Solar Cells by Deployment of Spectral Converters Containing Semiconductor Nanocrystals, Semiconductors, 38(8), pp. 962-969 (2004).

N.H. Reich, et al., Weak Light performance and spectral response of different solar cell types, in: Proceedings of the 20th European Photovoltaic Solar Energy Conference, (Eds. W. Palz, H. Ossenbrink, P. Helm), WIP-Renewable Energies, Munich, Germany, 2005, pp. 2120-2123.

Solar Electric Roof Tile: C21e, Solarcentury, www.solarcentury.com, 2006.

H. Field, Solar Cell Spectral Response Measurement Errors Related to Spectral Band Width and Chopped Light Form, 26th IEEE Photovoltaic Specialists Conference, Sep. 29-Oct. 3, 1997, Anaheim, California.

H. Hunter Fanney, Short-Term Characterization of Building Integrated Photovoltaic Panels, Proceedings of Solar Forum 2002: Sunrise on the Reliable Energy Economy, Jun. 15-19, 2002, Reno, Nevada.

Field Experience With a New Performance Characterization Procedure for Photovoltaic Arrays; D.L. King, J.A. Kratochvil, W.E. Boyson, and W.I. Bower; Sandia National Laboratories; 1998.

Building Integration of Photovoltaic Power Systems Using Amorphous Silicon Modules: Irradiation Loss Due to Non-Conventional Orientations; N.J.C.M. van der Borg, E.J. Wiggelinkhuizen; Dec. 2001.

AIGaN Photodiodes Respond to Ultraviolet C; Dryden Flight Research Center, Edwards, California; PennEngineering Fastening Technologies.

A Fast Low-Cost Solar Cell Spectral Response Measurement System with Accuracy Indicator; s. Silvestre, L. Sentis, and L. Castañer; IEEE Transactions on Instrumentation and Measurement vol. 48, No. 5 Oct. 1999.

Modeling Improvement of Spectral Response of Solar Cells by Deployment of Spectral Converters Containing Semiconductor Nanocrystals; Semiconductors, vol. 38, No. 8 pp. 962-969; W.G.J.H. M. van Sark; Copernicus Institute, Utrecht University, The Netherlands, 2004.

Weak Light Performance and Spectral Response of Different Solar Cell Types; N.H. Reich, W.G.J.H.M. van Sark, E.A. Alsema; Dept. of Science Technology and Society, Copernicus Institute for Sustainable Development and Innovation Utrecht University, the Netherlands.

Solar Electric Roof Tile: C21e Low Carbon Building Products; Solarcentury.

Solar Cell Spectral Response Measurement Errors Related to Spectral Band Width and Chopped Light Waveform; H. Field; National Renewable Energy Laboratory; Sep. 1997.

Short-Term Characterization of Building Integrated Photovoltaic Panels; A. Hunter Fanney, Mark W. Davis, and Brian P. Dougherty; Proceedings of Solar Forum 2002.

* cited by examiner

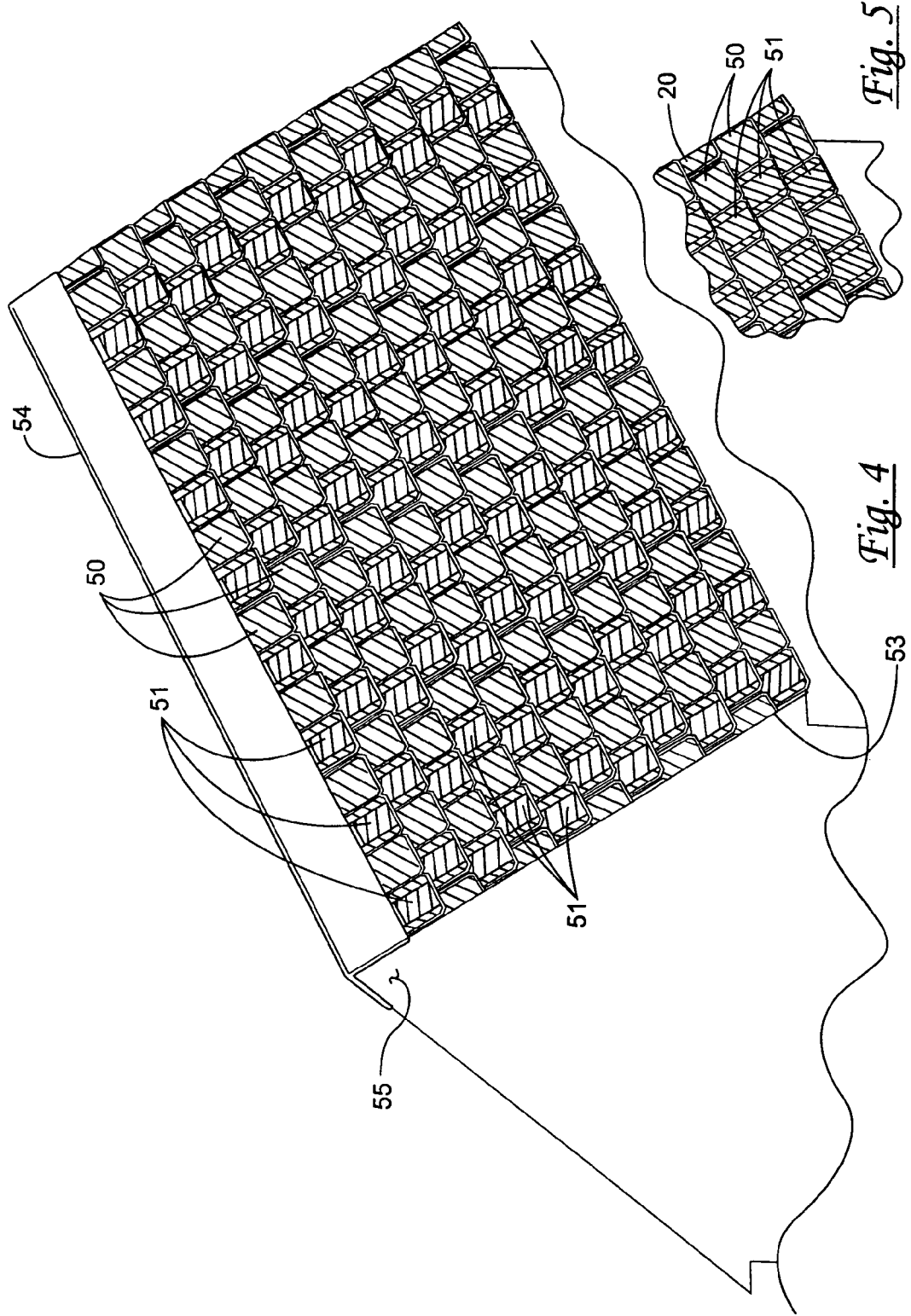

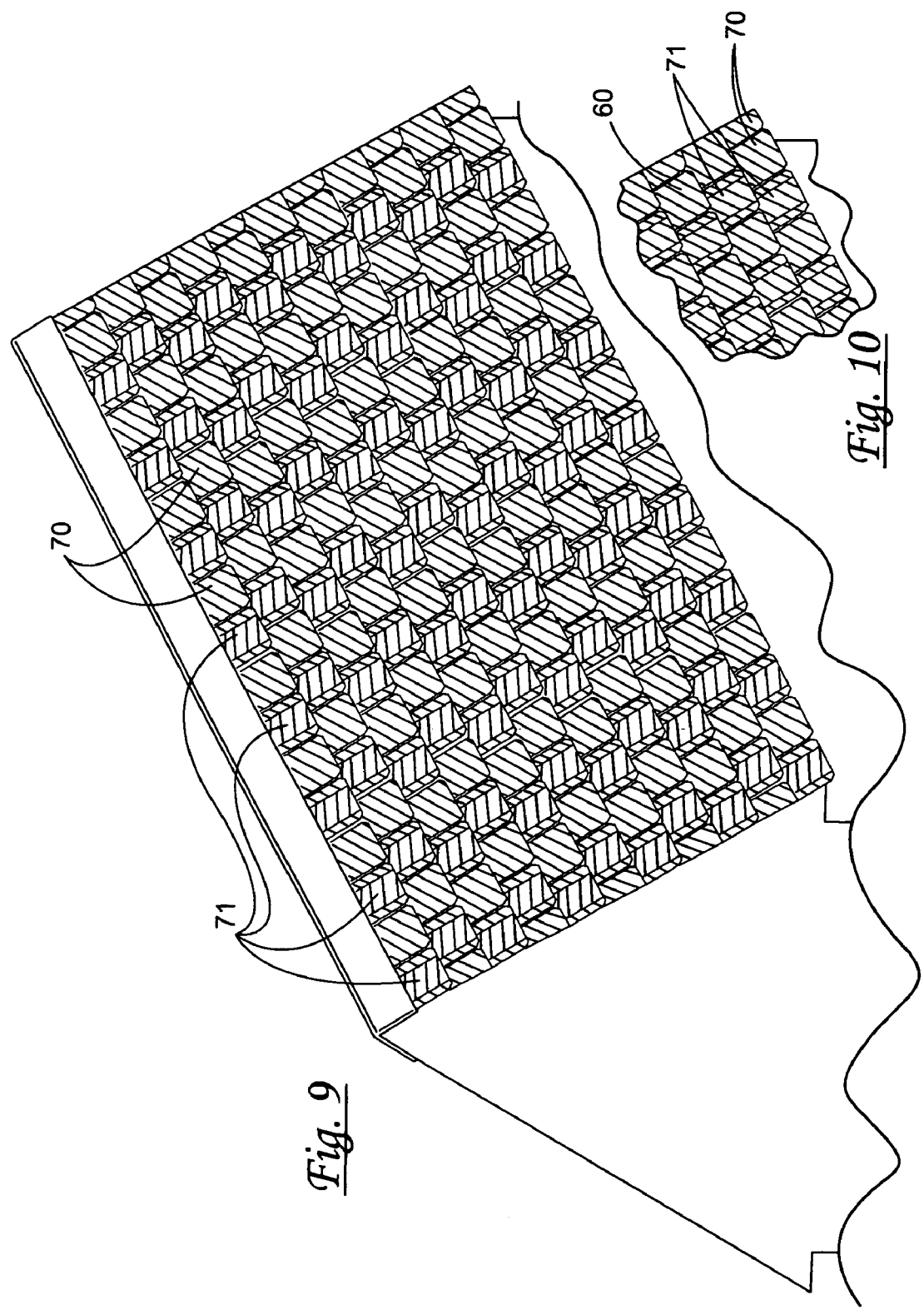

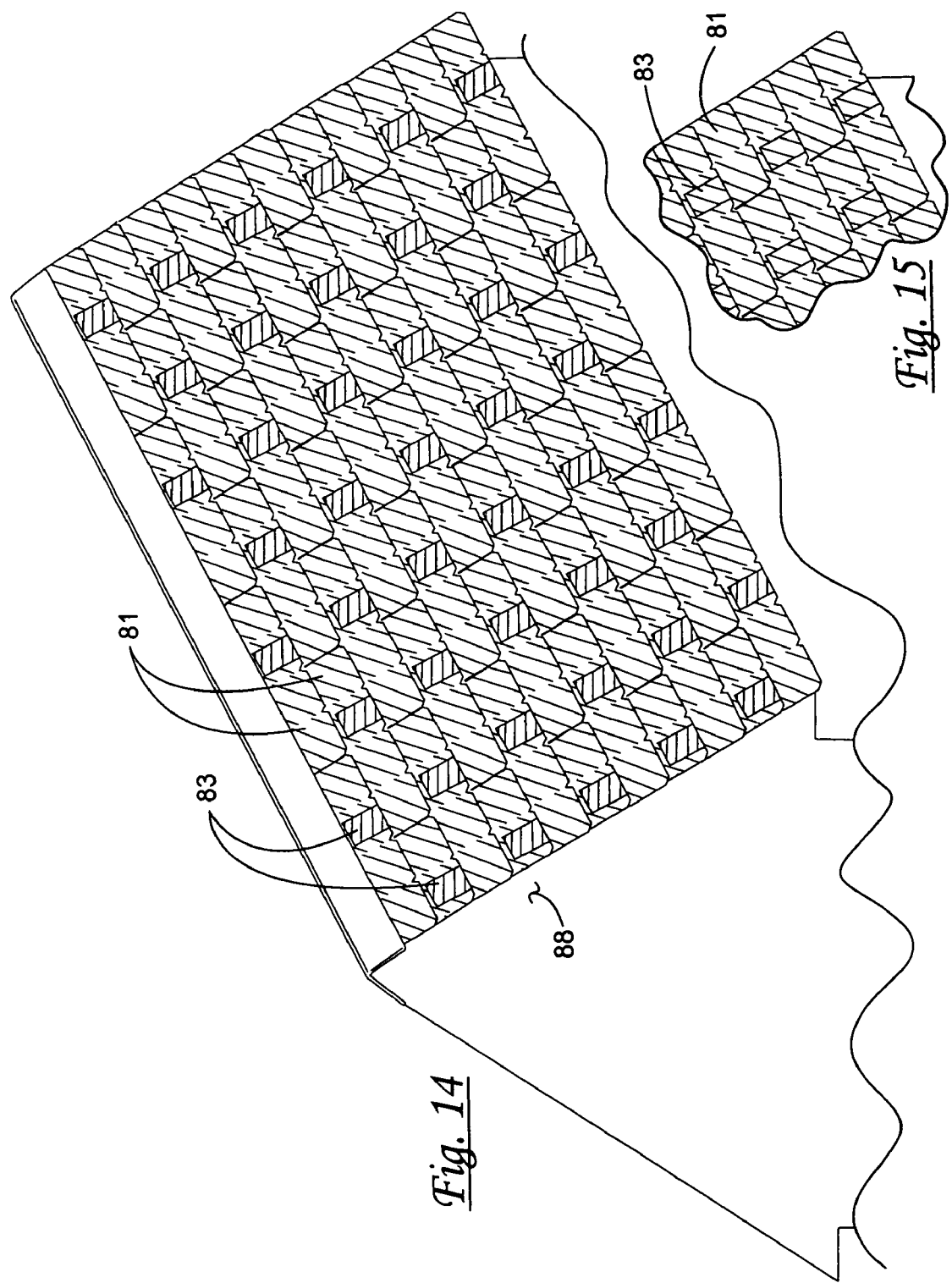

SHINGLE WITH PHOTOVOLTAIC ELEMENT(S) AND ARRAY OF SAME LAID UP ON A ROOF

BACKGROUND OF THE INVENTION

It is known to provide photovoltaic panels on a roof, to receive energy from the sun and to transform that energy into electrical energy for providing heat, for heating water, or for any of the other myriad uses that electrical energy can provide in a residence, office building, warehouse, or other structure.

It is also known that such photovoltaic panels can be bulky, unsightly, or otherwise undesirable in appearance, as well as expensive in their installation and use. Frequently, such panels need to be faced toward the direction at which the maximum amount of sun will impinge thereon, which may not be best direction for such panels to face to maximize aesthetic effects on a roof.

More recently, it has become known to integrate photovoltaic elements into roofing materials, such as shingles or the like, wherein certain shingles on a roof will have photovoltaic elements on their surfaces, comprising a roof zone or plurality of zones, wherein sunlight can create electricity, by having those particular shingles facing in a direction of the sun that will maximize exposure of the photovoltaic coated shingles to the sun.

THE PRESENT INVENTION

The present invention is directed to providing photovoltaic elements on shingles, with the shingles preferably being of asphalt shingle construction, having exposed tab portions and unexposed headlap portions. The photovoltaic elements are preferably applied as an overlay or attached to a shingle surface by means of a suitable adhesive bonding material.

In accordance with this invention, only a portion of the tab zones of the shingles are provided with active photovoltaic material leaving photoactive portions and non-photoactive portions so that the overall variegation of the shingles, when applied to a roof, are blended together to provide a desirable appearance, in that the active photovoltaic elements on the shingles are spread over, or distributed over the entirety of a large area of the roof.

Additionally, in accordance with this invention, by having only portions of the tab zones of the shingles being comprised of active photovoltaic material, the photovoltaic zones exist over a wide area of the roof so that, in case a portion of the roof is obscured, by shadows, trees, or the like, there would always be other portions of the roof with the photovoltaic elements on the shingles on those other portions of the roof that are impinged by available light/sun, to enable energy generation.

Also, in accordance with this invention, granule blends can be used to achieve complementary color arrangements between the photovoltaic elements and the non-active portions of the exposed parts of the shingle.

SUMMARY OF INVENTION

The present invention is directed to providing a shingle having butt and tab portions, wherein the tab portions are exposed when applied to a roof, and wherein active photovoltaic element(s) appear on portions only of the tab portions of the shingles, wherein adjacent zones of the tab portions of the shingles to which the photovoltaic element(s) are applied are free of active photovoltaic elements.

Accordingly, it is a primary object of this invention to provide a shingle as described in the summary of invention set forth above.

It is a further object of this invention to provide a novel array of shingles on a roof, wherein the shingles in the array are as described in the summary of invention set forth above.

It is yet another object of this invention to accomplish the above objects, wherein the shingle(s) are of the asphalt shingle type, comprising base mat, impregnated with a bituminous material and having surface granules thereon.

It is a further object of this invention to accomplish the above objects, wherein the active photovoltaic element(s) are distributed substantially uniformly over a major portion of a roof to which they are applied.

It is yet another object of this invention to accomplish the above objects, wherein the active photovoltaic element(s) visually complement the visually distinct zones of the shingles that do not have active photovoltaic elements thereon, or to visually blend with the visually distinct zones of the shingles not having active photovoltaic elements thereon.

Other objects and advantages of the present invention will be readily apparent upon a reading of the following brief descriptions of the drawing figures, the detailed descriptions of the preferred embodiments and appended claims.

BRIEF DESCRIPTIONS OF THE DRAWING FIGURES

FIG. 4 is an array of shingles of the type of FIG. 1, laid up on a roof wherein the photovoltaic elements are aesthetically complementary to portions of the exposed tab portions of the shingles on the roof.

FIG. 5 is a fragmentary illustration of a portion of a roof similar to that of FIG. 4, but wherein the photovoltaic element(s) aesthetically blend with those zones of the tab portions of shingles not having active photovoltaic elements thereon, and with the shingles being of the type of FIG. 1.

FIG. 9 is an array of shingles of the type of FIG. 6, laid up on a roof wherein the photovoltaic elements are aesthetically complementary to portions of the exposed tab portions of the shingles on the roof.

FIG. 10 is a fragmentary illustration of a portion of a roof similar to that of FIG. 9, but wherein the photovoltaic element(s) aesthetically blend with those zones of the tab portions of shingles not having active photovoltaic elements thereon, and with the shingles being of the type of FIG. 6.

FIG. 14 is an array of shingles of the type of FIG. 11, laid up on a roof wherein the photovoltaic elements are aesthetically complementary to portions of the exposed tab portions of the shingles on the roof.

FIG. 15 is a fragmentary illustration of a portion of a roof similar to that of FIG. 14, but wherein the photovoltaic element(s) aesthetically blend with those zones of the tab portions of shingles not having active photovoltaic elements thereon, and with the shingles being of the type of FIG. 11.

Figure 16:
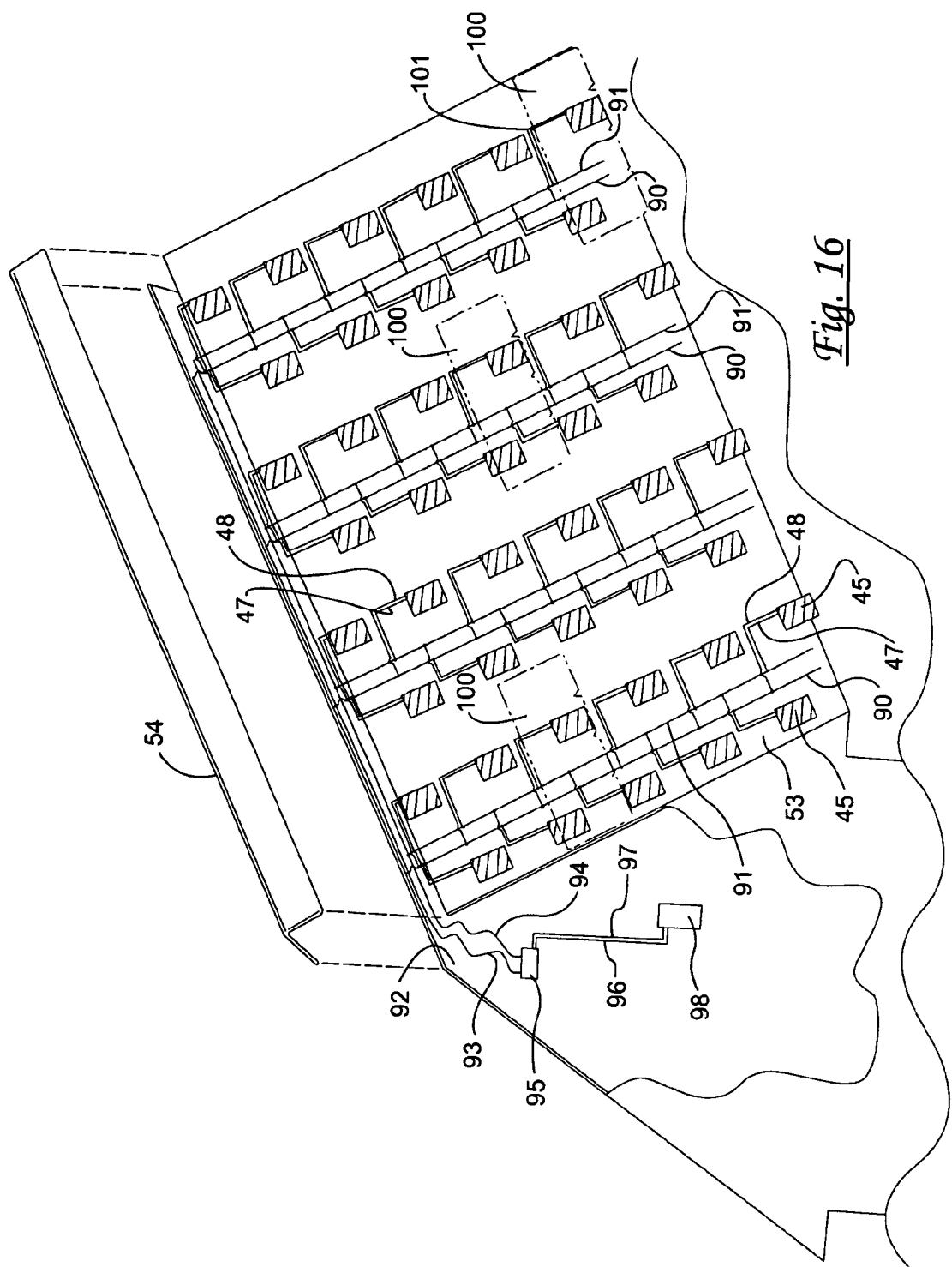

FIG. 16 is a schematic illustration of the electrical connections of active photovoltaic elements to electrical buss lines that are laid up on a roof prior to application of the shingles, wherein wires from the photovoltaic elements extend up from the tab portions of shingles to which they are applied, across the headlap portions of those shingles, and along the roof to the generally vertically disposed buss lines, prior to application of next-overlying shingles, to openings in the ridge of the roof, and electrically connected to an inverter and electrical panel within the building, and with shingles being illustrated in phantom on the roof, to more clearly illustrate the electrical connections of the photovoltaic elements.

DETAILED DESCRIPTIONS OF THE PREFERRED EMBODIMENTS

Figure 1:
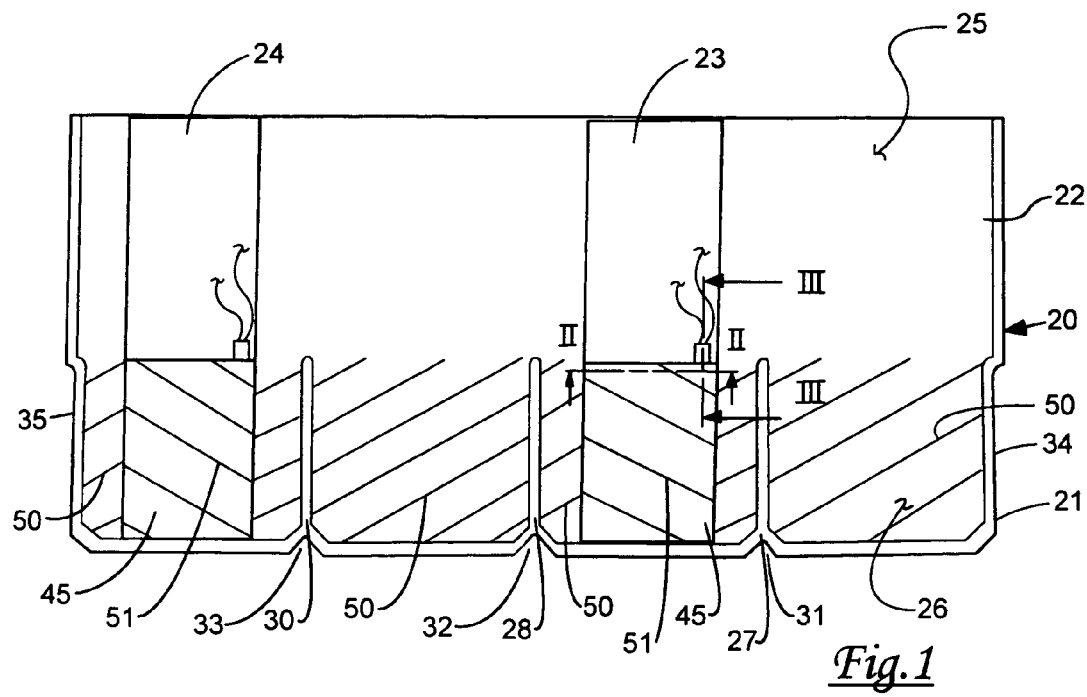
FIG. 1 is a front view of a triple layer shingle, in accordance with this invention, having active photovoltaic elements disposed on portions of the tab portion of the shingle that are adapted to be exposed when laid up on a roof.

Referring now to FIGS. 1 through 5 in detail, it will be seen that the shingle 20 is a three-layer shingle, comprised of a posterior layer 21, an anterior layer 22, and a plurality of overlying shingle layers 23 and 24 on the upper surface of the anterior layer 22, preferably spaced apart as shown, for example only, in FIG. 1. It will be understood that the layers 23, 24 can be placed overlying other portions of the anterior shingle layer 22 as may be desired for different aesthetic effects.

The shingle 20 has an upper butt or headlap portion 25, and a lower tab portion 26.

The anterior shingle layer 22 may have a plurality of slots 30 therein, that may be aesthetically enhanced by cut-out notches 31, 32 and 33 as shown. Right and left edges of one or both shingle layers 21, 22 of the tab portion 26 of the shingle 20 may be cut back as shown at 34 and 35, respectively.

The general construction of the shingle 20 may be as set forth, for example, in U.S. Pat. Nos. 5,181,361 and/or 5,209,802.

Each of shingle layers 21, 22 and 23 will preferably be comprised of a layer of fiberglass or other mat 36 impregnated with bitumen and having on its upper and lower surfaces, respectively, a layer of bitumen 37, 38, with a layer 40 of granules on an upper surface, and a layer 41 of smaller granular particles, such as sand, mica, etc. on its lower surface.

Figure 2:
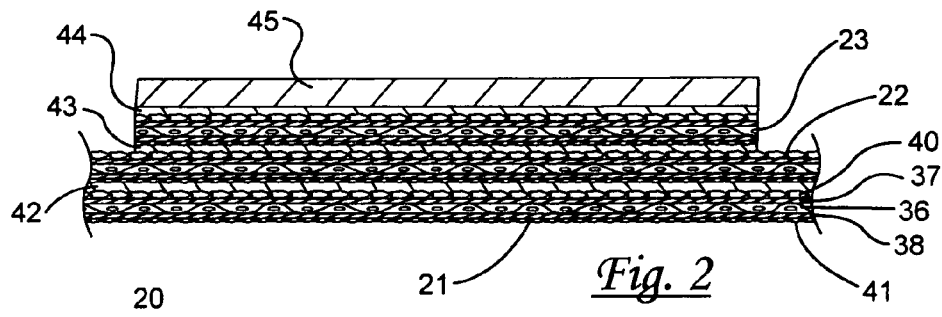
FIG. 2 is a fragmentary horizontal cross-sectional view taken generally along the line of II-II of FIG. 1.

Adhesive layers or spots or stripes 42, 43, which may also be of a bitumen material, will connect the shingle layers 21, 22 and 23 together. On the top surface of shingle layer 23, as shown in FIG. 2, is another adhesive layer 44 of bitumen or the like, for securing thereto photovoltaic elements 45. The photovoltaic elements 45 are adapted to receive solar energy and to generate electricity therein for delivery to an electricity grid within the house or other building, as will be described hereinafter, or in some other manner.

Figure 3:
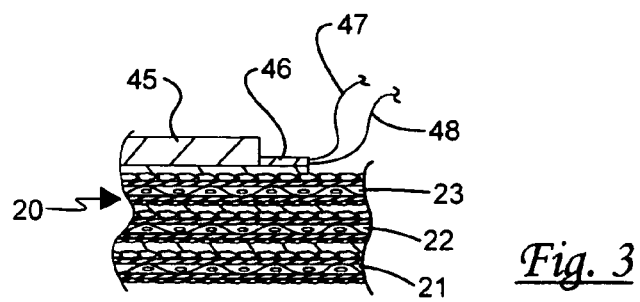
FIG. 3 is a fragmentary vertical sectional view, taken generally along the line of III-III of FIG. 1.

With reference to FIG. 3, it will be seen that the photovoltaic element 45 has a connector 46, to which are connected electric transmission wires 47, 48.

With reference to FIG. 1 it will be seen that the cross-hatching 50 shown on the tab portions 26 of the anterior shingle layer 22 are shown all in the same direction, going upwardly and to the right, to demonstrate a predetermined aesthetic appearance for the tabs, whereas the cross-hatching 51 shown in FIG. 1 for the tab portions of the overlying shingle layers 23, 24 that comprise the photovoltaic elements 45, go in the opposite direction, or upwardly to the left. This is to illustrate that the surface shading, granule application, or other aesthetic presentation 51 for the elements 45 can be complemental to the aesthetic presentations 50, in order to achieve a complemental aesthetic effect.

An alternative would be that the surface appearances for the elements 45 could be selected to be substantially the same as the surface appearances 50 for the tab portions of the shingle layer 22 that are visible when installed, to give a substantially homogenous effect.

It will also be understood that the tab portions (lower portions) of the shingle layer 22 and/or of shingle layers 23, 24 will be visually distinct, either by the surface application, by separation by means of slots 27, 28, 30 or the like, by different material thicknesses, different numbers of layers of shingle material, different numbers of overlay, different colors, different combinations of colors, different surface ornamentation, or combinations of any of the forgoing.

It will also be understood that there will generally be spacings apart of the photovoltaic elements 45, across the shingle 20, leaving spaces in the tab zones thereof that are free of active photovoltaic elements, and that the aggregated width from left to right across a shingle 20, of all of its photovoltaic element(s) will be less than half the shingle width.

With reference now to FIG. 4, it will be seen that shingles 20 of the type illustrated in FIGS. 1-3 are shown laid up in courses on a sloped roof, in lapped relation, with successive courses of shingles of an overlying course having their tab portions overlying butt portions of the shingles of a next-underlying course, and with active photovoltaic elements 51 for the shingles being distributed substantially uniformally over at least a major portion of the roof 53 to which they are applied, and preferably over substantially the entire roof to which they are applied. At the upper end of the roof 53 of FIG. 4 there is provided a roof ventilator 54 covering the ridge 55 of the roof.

In the array of shingles illustrated in FIG. 4, it will be seen that the elements 51 applied to the shingles 20 are selected to be complemental to the rest of the visible surfaces of the shingles, rather than uniform therewith.

In FIG. 5, there is a fragmentary illustration similar to a portion of the roof illustrated in FIG. 4, but wherein the elements 51 have been selected to visually blend with the visually distinct zones of the installed shingles not having active photovoltaic elements thereon.

With reference now to FIGS. 6 through 10, shingles in accordance with this invention are presented, that differ from the shingles illustrated in FIGS. 1-5, in that the shingles of FIGS. 6-10 are essentially two-layer shingles, as distinguished from the three-layer shingles of FIGS. 1-5. Thus, the shingles 60 of FIGS. 6-10 are comprised of a posterior shingle layer 61, and an anterior shingle layer 62, each of which layers are constructed similar to those layers 21, 22 and 23 described above, so that such description need not be duplicated herein. However, the shingle layers 61 and 62 are adhesively connected at 63, and there is an adhesive 64 for connecting photovoltaic element(s) 65 thereto. Each photovoltaic element 65, similar to the photovoltaic element(s) 45 of the above-discussed embodiment, likewise has a connector 66 and electrical connection wires 67 and 68 for connection to an electric grid, as described herein for the previous embodiment.

Figure 6:
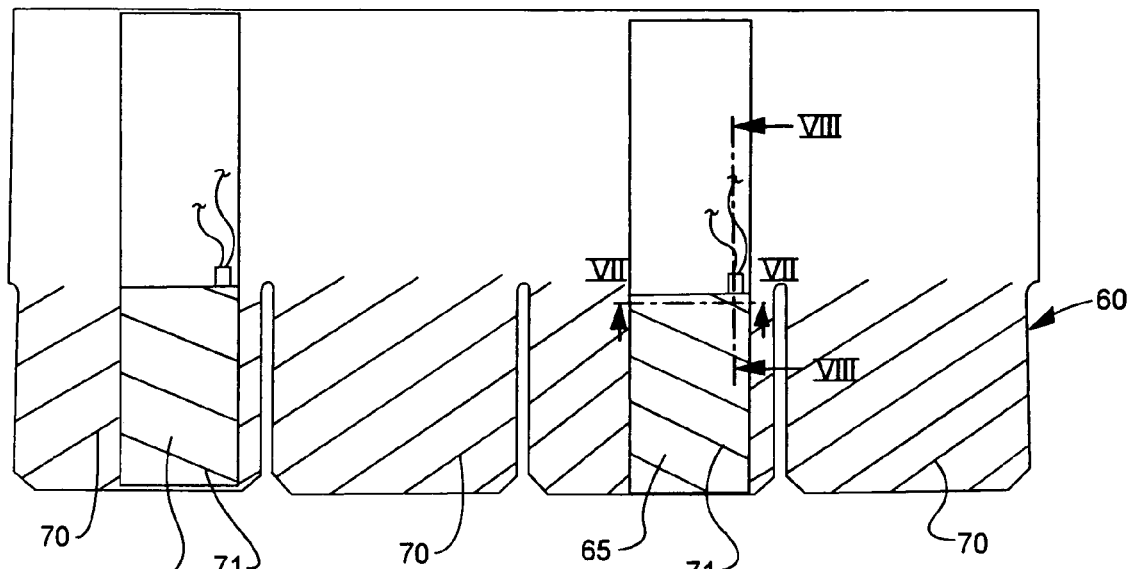
FIG. 6 is a front view of a two layer shingle, in accordance with this invention, having active photovoltaic elements disposed on portions of the tab portion of the shingle that are adapted to be exposed when laid up on a roof.
Figure 7:
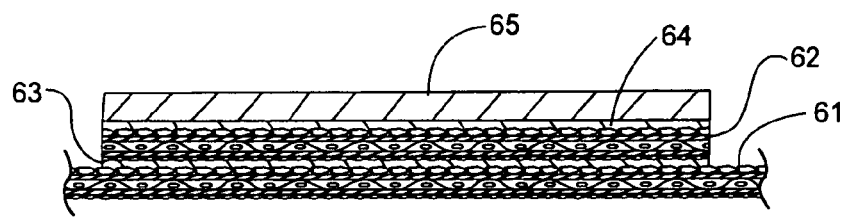
FIG. 7 is a fragmentary horizontal cross-sectional view taken generally along the line of VII-VII of FIG. 6.
Figure 8:
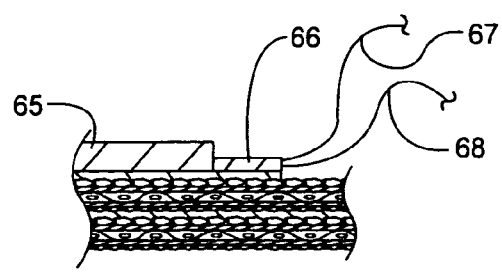
FIG. 8 is a fragmentary vertical sectional view, taken generally along the line of VIII-VIII of FIG. 6.

The complemental surface configurations shown in FIG. 6, for the different visual appearances 70 and 71 corresponds, respectively, to the different complemental surface appearances 50 and 51 for the embodiment of FIG. 1, and need not be repeated herein. Similarly, the respective surface appearances 70 and 71 that are complementally illustrated in the array of shingles illustrated in FIG. 9 correspond to those 50 and 51 in the embodiment of FIG. 4, and need not be repeated herein. Similarly, the blending of surface appearances 70 and 71 for the fragmental illustration of FIG. 10 is similar to that 50 and 51 illustrated in FIG. 5, and need not be repeated herein.

For the construction of the individual shingles for the embodiment of FIGS. 6-10, such can be constructed similar to that set forth in U.S. Pat. Nos. 5,660,014 and/or 5,426,902, for example.

With reference now to the embodiment of FIGS. 11-15, it will be seen that the shingle generally designated 80 therein, will be comprised of a single layer 81 of shingle material, constructed in a manner similar to each of layers 21, 22 and 23 of the embodiment of FIGS. 1-5, and with an adhesive 82 applied to an upper surface thereof, for securing thereto a photovoltaic element 83 of the same type as in the embodiments previously discussed for FIGS. 4-10. The photovoltaic element 83 likewise has a connector portion 84 extending up into the headlap portion 85 of the shingle 80, as do the previously discussed embodiments, and with the connector 84 having electric wires 86, 87 connected thereto, for connection to an electric grid as will be discussed hereinafter.

The shingles 80 of the embodiment of FIGS. 11-15, could for example, be constructed in accordance with the overlay teachings of U.S. Pat. Nos. 4,295,445 and/or 4,352,837, if desired.

Figure 11:
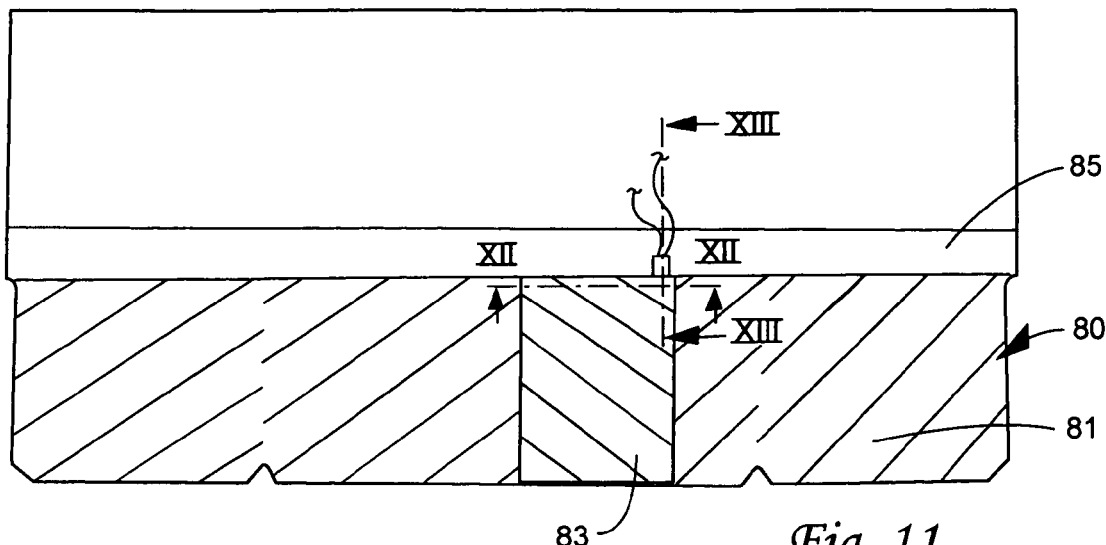
FIG. 11 is a front view of a single layer shingle, in accordance with this invention, having active photovoltaic elements disposed on portions of the tab portion of the shingle that are adapted to be exposed when laid up on a roof.
Figure 12:
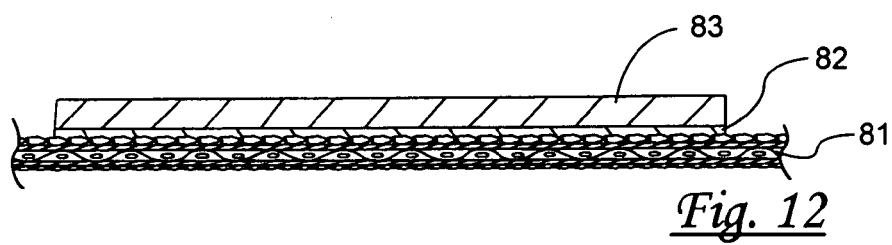
FIG. 12 is a fragmentary horizontal cross-sectional view taken generally along the line of XII-XII of FIG. 11.
Figure 13:
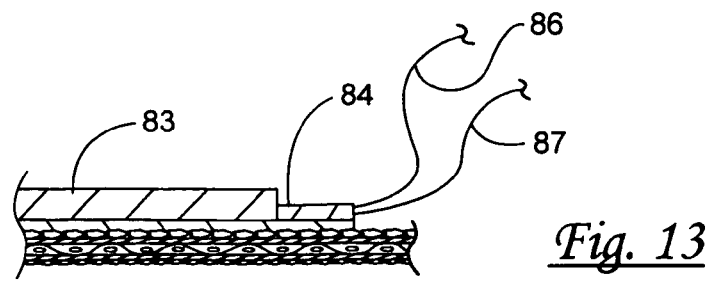
FIG. 13 is a fragmentary vertical sectional view, taken generally along the line of XIII-XIII of FIG. 11.

It will be apparent that in FIG. 11, the surface configurations for the tab portions of the shingle layers 81 and for the photovoltaic elements 83 are complemental to each other, as discussed for the previous embodiments, to yield, in the laid-up array of shingles of FIG. 14, active photovoltaic elements that are arranged to visually complement the visually distinct zones of the shingles to which they are applied and which do not have active photovoltaic elements thereon, similar to the presentations of FIGS. 4 and 9 discussed above, with the active photovoltaic elements 83 being distributed substantially uniformly over a major portion of and preferably over substantially the entire roof 88 to which they are applied.

With reference to FIG. 15, it will be seen that the photovoltaic elements 83 are applied such that their upper surfaces as shown, visually blend with the visually distinct zones of the shingles not having active photovoltaic elements thereon, as shown by the similar cross-hatching at 81, 83, in FIG. 15.

With reference now to FIG. 16, a typical or representative arrangement is illustrated for the electrical connection together of the various photovoltaic elements.

The arrangement of FIG. 16 will now be described with reference to the numerals used for describing the embodiment of FIGS. 1-5, although it will be understood that the arrangement of FIG. 16 can apply as well to the shingles as described in the embodiment of FIGS. 6-10 and the embodiment of FIGS. 11-15, as well.

In FIG. 16 it will be seen that the elements 45, each have their electric connection wires 47, 48, electrically connected to electric lines 90, 91, running in a series of generally vertical grids, up along the sloped surface of a roof 53, as shown, with the grid wires 90, 91 in turn being connected through a ridge opening, to electric connection wires 93, 94, that in turn may be connected to an inverter 95 that, in turn is connected via wiring 96, 97 to a control box 98 in the house, warehouse, office building or other structure, for supplying electricity to various electricity-using appliances within the structure illustrated in FIG. 16.

In the illustration of FIG. 16, while the photovoltaic elements 45 for the shingles 20 are shown, the shingles 20 of FIGS. 1-5 are not illustrated, for the sake of clarity, except to the extent that they are illustrated in phantom at a few locations at 100 in FIG. 16. This is because, in the representative embodiment of FIG. 16 for electrically connecting the photovoltaic elements 45, it will be seen that the wires 47, 48, travel up into the headlap portions of the shingles on which they are mounted, to transcend above the upper edges of the headlap portions of those shingles, as shown, for example, at 101 in the lower right corner of FIG. 16, to then pass laterally for electrical connection to the wires 90, 91, so that, preferably, no wiring will have to pass through a shingle, per se, in that a next-overlying shingle such as that illustrated in phantom 100 will then cover the wiring of the underlying shingle, and that therefor, as successive courses of shingles are applied to a roof, the wiring associated with the photovoltaic elements 45 of a previously applied course of shingles will be covered by the next-overlying course of shingles and that all of the photovoltaic elements 45 will be connected together in the grid shown in FIG. 16, for example.

It should be understood that variations of the electrical connections could be made, within the scope of this invention. For example, while FIG. 16 illustrates an array having a series of generally vertical grids for the electrical connections with system connections by way of a ridge opening, alternative embodiments could have other orientation, such as for example, generally horizontal grids with system connections at an edge of a roof or a roof portion. For example, the electrical connections could proceed to a rake or valley in the roof structure, or to other locations in a complex roof, while preferably avoiding the necessity of making a number of additional openings or holes through the roof and/or its shingles.

It will be apparent from the foregoing that various modifications may be made in the details of construction as well as in the use and operation of shingles and their arrays, in accordance with the present invention, all within the spirit and scope of the invention as defined in the appended claims.

What is claimed is:

1. A shingle comprising at least one layer of shingle material; the shingle material having top and bottom surfaces, upper and lower edges defining the shingle height, and right and left edges defining the shingle width; the shingle having a butt portion extending from the upper edge toward the lower edge and between the right and left edges and being adapted to be substantially covered when installed on a roof; the shingle having a tab portion extending from the lower edge toward the upper edge and between the right and left edges and being adapted to be substantially exposed when installed on a roof; the top surface of the tab portion of the shingle having a plurality of visually distinct zones serially arranged between said right and left edges; said visually distinct zones comprising at least one of:
   (i) zones of different material thicknesses;
   (ii) zones of different numbers of layers of shingle material;
   (iii) zones of different numbers of overlay;
   (iv) zones of different colors;
   (v) zones of different combinations of colors;
   (vi) zones of different surface ornamentation;
   (vii) combinations of any of (i) through (vi) above;

wherein at least one said zone includes an active photovoltaic element of predetermined height and width; wherein said at least one zone that includes an active photovoltaic element having any zones that are adjacent thereto being free of an active photovoltaic element; and with the aggregate width of the total number of the at least one photovoltaic element of the shingle being less than half the shingle width.

2. The shingle of claim 1, wherein the visually distinct zones comprise zones of different material thicknesses.

3. The shingle of claim 1, wherein the visually distinct zones comprise zones of different numbers of layers of shingle material.

4. The shingle of claim 1, wherein the visually distinct zones comprise zones of different numbers of overlay.

5. The shingle of claim 1, wherein the visually distinct zones comprise zones of different colors.

6. The shingle of claim 1, wherein the visually distinct zones comprise zones of different combinations of colors.

7. The shingle of claim 1, wherein the visually distinct zones comprise zones of different surface ornamentation.

8. The shingle of claim 1, wherein the tab portion of the shingle comprises a plurality of spaced-apart tabs separated by slots between tabs, and wherein a photovoltaic element substantially covers a said tab.

9. The shingle of claim 1, wherein the shingle includes at least one laminated layer of shingle material disposed on top of at least a tab portion of the at least one layer of shingle material; and wherein said photovoltaic element is on the tab portion of the at least one laminated layer of shingle material.

10. The shingle of claim 1, wherein the shingle includes at least one overlay disposed on top of at least a tab portion of the at least one layer of shingle material; and wherein said photovoltaic element is on the tab portion of the at least one overlay.

11. An array of shingles according to any one of claims 7-10, wherein the shingles are disposed on a sloped roof in lapped relation, in a plurality of courses, with successive courses of shingles of an overlying course having its tab portions overlying butt portions of the shingles of a next-underlying course; with the active photovoltaic elements of the shingles being distributed substantially uniformly over a major portion of a roof to which they are applied.

12. The array of shingles of claim 11, with the active photovoltaic elements of the shingles being distributed substantially uniformly over substantially the entire roof to which they are applied.

13. The array of shingles of claim 11, wherein the zones of the shingles having active photovoltaic elements thereon visually complement the visually distinct zones of the shingles not having active photovoltaic elements thereon.

14. The array of shingles of claim 11, wherein the zones of the shingles having active photovoltaic elements thereon visually blend with the visually distinct zones of the shingles not having active photovoltaic elements thereon.

15. The array of shingles of claim 11, where the active photovoltaic elements in the array are electrically interconnected via a plurality of electrical connections.

16. The array of shingles of claim 15, including an inverter, to which the photovoltaic elements are connected, and a breaker box, to which the inverter is electrically connected.

* * * * *